V. HENRI, A. HELBRONNER & M. VON RECKLINGHAUSEN.
PROCESS FOR ARTIFICIALLY MATURING OR AGING WINES, SPIRITS, OR OTHER POTABLE LIQUORS.
APPLICATION FILED MAY 31, 1910.
1,130,400. Patented Mar. 2, 1915.
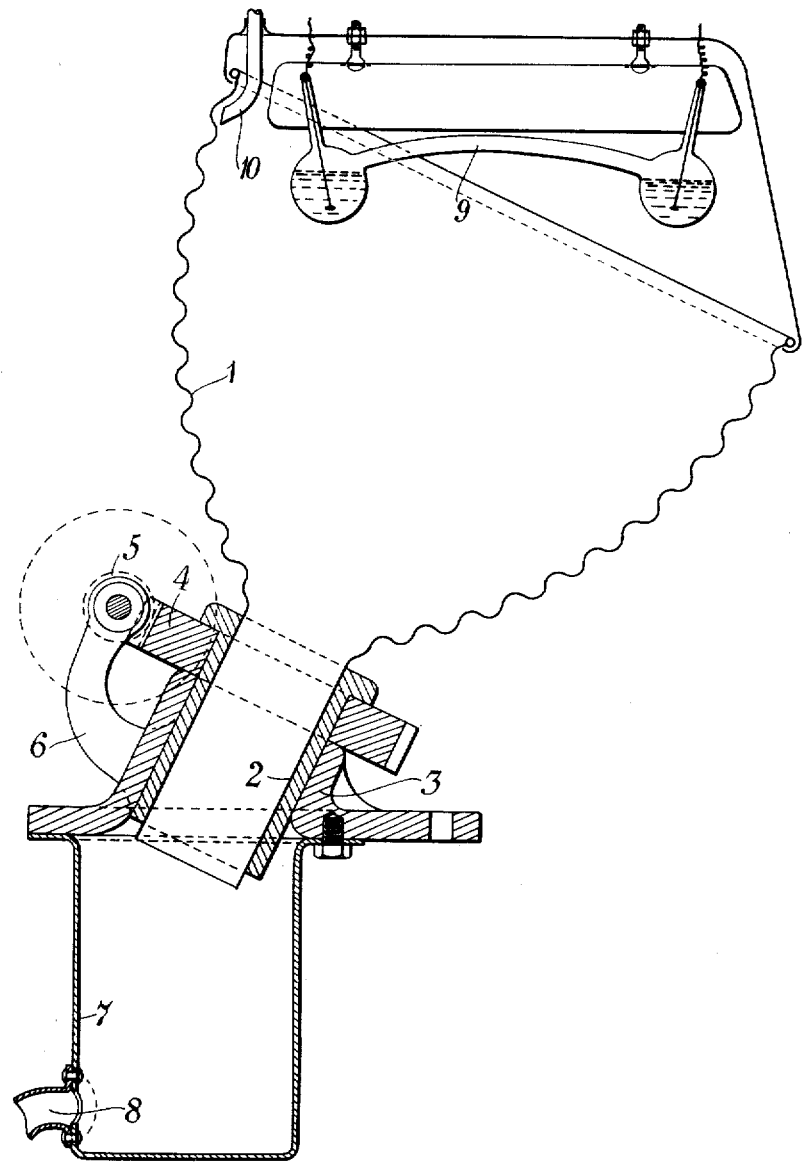

UNITED STATES PATENT OFFICE.

VICTOR HENRI, ANDRÉ HELBRONNER, AND MAX VON RECKLINGHAUSEN, OF PARIS, FRANCE, ASSIGNORS, BY MESNE ASSIGNMENTS, TO THE R. U. V. COMPANY, INC., A CORPORATION OF NEW YORK.

PROCESS FOR ARTIFICIALLY MATURING OR AGING WINES, SPIRITS, OR OTHER POTABLE LIQUORS.

1,130,400.  Specification of Letters Patent.  Patented Mar. 2, 1915.

Application filed May 31, 1910. Serial No. 564,062.

*To all whom it may concern:*

Be it known that we, VICTOR HENRI and ANDRÉ HELBRONNER, citizens of the Republic of France, and MAX VON RECKLINGHAUSEN, a subject of the Emperor of Germany, residing at Paris, France, have invented a new and useful Improvement in Processes for Artificially Maturing or Aging Wines, Spirits, or other Potable Liquors, of which the following is a specification.

This invention relates to the manufacture of wine and other potable liquors.

The process of vinification after pressing of the grapes may be divided into two main stages, the first of which is the fermentation stage in which the alcohol is produced. In the second stage which takes place while the wine is resting in vats, casks or bottles, various chemical compounds, mainly ethers, are produced which give to the wine its characteristic flavor and bouquet. This second stage which may be called "maturing" or "aging" generally takes a considerable time and it is to this stage of the manufacture that the present invention relates.

We have found that after fermentation, wine is very susceptible to the influence of ultra-violet rays and according to our invention we expose it to the action of these rays, preferably in a thin film by which means the taste and color of the wine is changed advantageously and the desirable characteristics of an old wine are quickly attained.

The wine or other liquor to be aged is treated by means of rays in a concentrated form such as produced by a vapor electric lamp having a quartz container.

In order that our invention may be clearly understood we will proceed to describe by way of example one form of apparatus by which it may be carried into practical effect. As shown in the accompanying drawing which is a sectional view, the apparatus comprises a closed funnel-shaped vessel, 1, having corrugated walls and supported rotatably at its lower end, 2, in a fixed bearing, 3, so that its axis is inclined to the perpendicular. Secured on the lower end of the funnel is a gear wheel, 4, which meshes with a worm, 5, supported in a bracket, 6, so that the funnel may be rotated.

In one test we made with this apparatus the wine, which was a sample of that known as "banyuls," was two years old, and was delivered into the funnel 1 through a pipe, 10, so that it ran down the sides of the funnel through the vent at the bottom into a container, 7, from which it was drawn off through a pipe, 8. By the rotation of the funnel on its axis through the medium of the gearing 5, 4 the stream of liquid was caused to spread over the corrugated surface in a thin film. Inside the funnel was placed as close to the side as possible a mercury vapor lamp, 9, having a quartz container of the size which takes a current of about three and one-half amperes. The quantity of wine which was tested—about two and one half liters—took several minutes to pass through the funnel, during which time it was exposed to the ultra-violet rays from the lamp 9, and it was found that the taste and characteristics of the wine after this exposure was similar to those which would be expected in wine which was several years older.

The apparatus above described forms no part of our present invention as any suitable apparatus can be employed.

We wish it to be understood that the same process may also be employed in maturing or aging potable liquors such as spirits in which chemical changes are required to be produced of a somewhat similar nature to those which take place in maturing and aging wine.

We are aware that it has been proposed to artificially age or mature wines and similar liquors by exposing them to actinic light and other forms of radiant energy, but the methods described have not come into general use, because the sources of energy described have not been sufficiently rich in ultra-violet rays to be effective and also in some cases because the liquors have been inclosed during the exposure in ordinary glass bottles which it is now known are practically opaque to ultra-violet rays.

We claim as our invention:—

1. The process for artificially maturing or aging wines, spirits and other potable liquors which consists in submitting the liquor to the action of concentrated ultra-violet rays.

2. The process for artificially maturing or aging wines, spirits and other potable liquors which consists in submitting the liquor to the direct action of concentrated ultra-violet rays produced by a vapor electric lamp in close proximity to the wine under treatment.

3. The process for artificially maturing or aging wines, spirits and other potable liquors which consists in submitting the liquor to the action of ultra-violet rays produced by a mercury vapor electric lamp.

4. The process for artificially maturing or aging wines, spirits and other potable liquors, which consists in submitting the liquor to the action of concentrated ultra-violet rays produced by a vapor electric lamp having a quartz container.

5. The process for artificially maturing or aging wines, spirits and other potable liquors, which consists in submitting the liquor in the form of a thin film, to the action of ultra-violet rays, said rays being produced by a vapor electric lamp having a quartz container.

6. The process for artificially maturing or aging wines, spirits and other potable liquors, which consists in delivering the liquor into a rotatable and closed funnel with corrugated sides, allowing the same to run down in the form of a thin film, and submitting said thin film of liquor, while the funnel is rotated, to the action of ultra-violet rays produced by a vapor electric lamp having a quartz container.

7. The process of artificially maturing or aging wines or other potable liquors which consists in subjecting the liquor in the form of a thin film to the action of concentrated ultra-violet rays.

8. The process for artificially maturing or aging wines, spirits and other potable liquors which consists in submitting the liquor in the form of a thin film to the action of ultra-violet rays.

In testimony whereof we have hereunto subscribed our names this 13th day of May, 1910.

VICTOR HENRI.
ANDRÉ HELBRONNER.
MAX von RECKLINGHAUSEN.

Witnesses:
  H. C. COXE,
  JACK H. BAKER.

It is hereby certified that in Letters Patent No. 1,130,400, granted March 2, 1915, upon the application of Victor Henri, André Helbronner, and Max von Recklinghausen, of Paris, France, for an improvement in "Processes for Artificially Maturing or Aging Wines, Spirits, or Other Potable Liquors," errors appear in the printed specification requiring correction as follows: Page 2, lines 2-3, strike out the words "in close proximity to the wine under treatment"; same page, line 8, change the period to a comma and insert the words *in close proximity to the wine under treatment.*; and that the said Letters Patent should be read with these corrections therein that the same may conform to the record of the case in the Patent Office.

Signed and sealed this 30th day of March, A. D., 1915.

[SEAL.]
J. T. NEWTON,
*Acting Commissioner of Patents.*